Dec. 18, 1928.  1,695,627
O. ZERK, NOW BY JUDICIAL CHANGE OF NAME O. U. ZERK
GREASE GUN
Filed Nov. 30, 1921
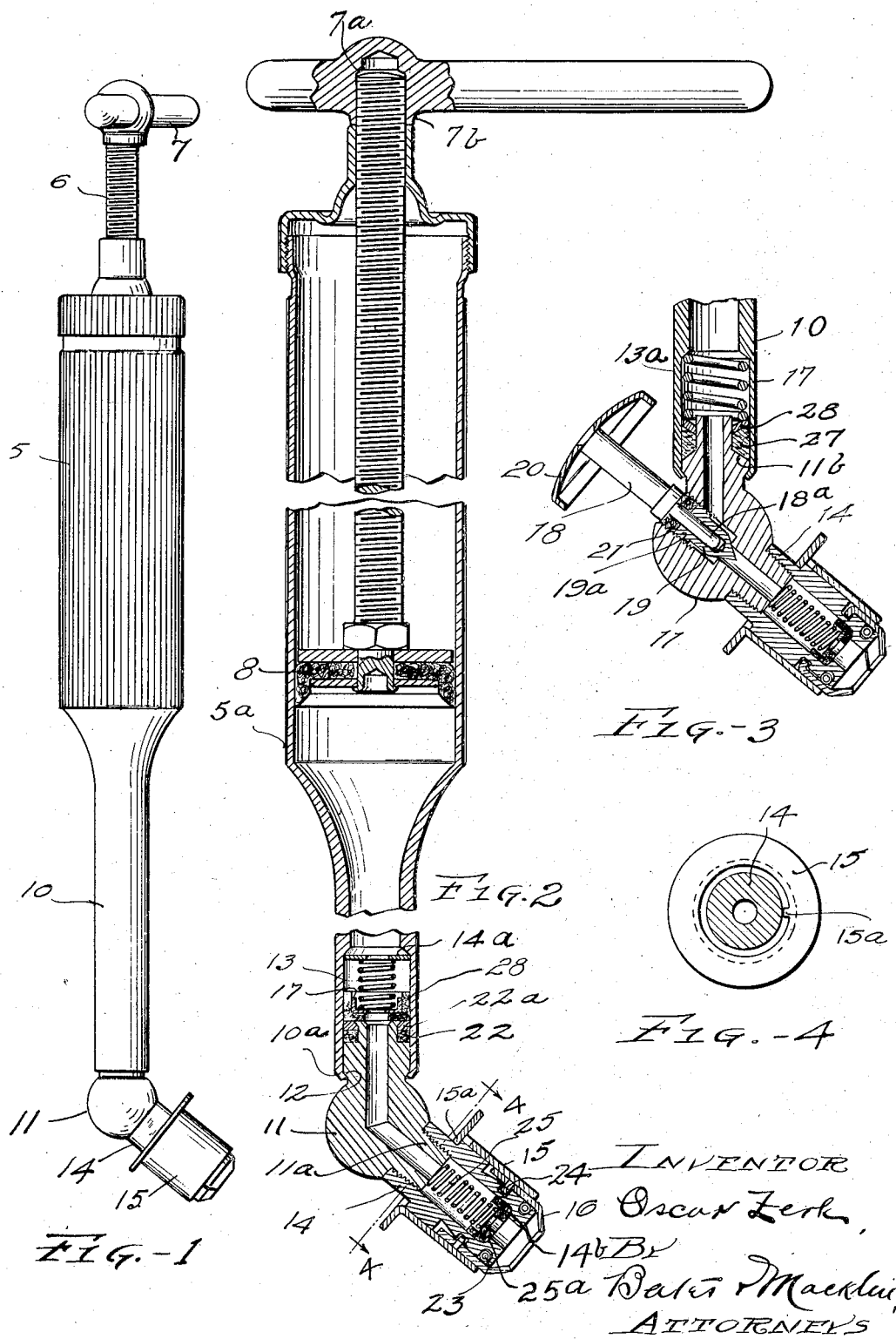

Patented Dec. 18, 1928.

1,695,627

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO ALEMITE MANUFACTURING CORPORATION, OF CHICAGO, ILLINOIS, A CORPORATION OF DELAWARE.

GREASE GUN.

Application filed November 30, 1921. Serial No. 518,755.

This invention is concerned with lubricaing devices and is particularly directed to improvements in grease guns such as are interchangeably coupled with grease cups or nipples secured to the various minor parts of automobiles or other mechanisms.

There has been a variety of grease guns which are adapted to be connected to lubricating nipples, the latter usually being provided with a check valve for retaining the lubricant after it has been forced therein under pressure from the grease gun. As some of the nipples are attached to remote parts of the automobile, it frequently occurs that a flexible tube or an articulated conduit is required to attach the gun to the nipple, in positions on the vehicle. In making a careful analysis of all of the positions in which the lubricating nipples are positioned on the various makes of automobiles, I have found that the use of flexible conduits, or universal joints on the conduits are not necessary to efficiently couple the gun to the nipples.

The general object of my invention, therefore, is the provision of a grease gun having simple but novel coupling means directly attached to the gun barrel by a swivel connection; the swivel connection being provided with self-sealing means and also arranged to carry the coupling means, the construction being such that efficiency, as well as economy is maintained by the use of a minimum number of simple parts.

A further object of my invention is the provision of a simple manually operated valve adapted to close the passageway from the gun barrel to the coupling means whereby pressure may be exerted upon the lubricant in the gun barrel before the gun is placed in use.

A further object of my invention is to angularly position said valve means on the gun in such a manner that it may be readily closed before the gun is disconnected from the lubricating nipple whereby a number of the nipples may be filled without leakage and without necessitating a repetition of the compressing operation.

An additional object of the present invention is the provision of a novel valve and coupling construction in alignment with each other and swivelly connected to the gun barrel. The center line of the aligned coupling and valve being fixed at an obtuse angle to the center line of the gun barrel.

Another object of this invention is the provision of a highly efficient and economically constructed coupling.

Other objects will become apparent from the following description which refers to the accompanying drawings. The essential characteristics will be summarized in the claims.

In the drawings, Fig. 1 is a view of my gun provided with nipple coupling means; Fig. 2 is an enlarged cross sectional view taken through the center of the gun and coupling means; Fig. 3 is a fragmentary view of the coupling means provided with a manually operated valve; Fig. 4 is a cross sectional view taken along the line 4—4 of Fig. 2.

Designating the various parts of the gun by the use of reference numerals, 5 is a grease gun barrel having the usual screw plunger 6 provided with a suitable handle 7 secured to the outer end thereof. The screw member 6 is arranged to engage a suitable threaded aperture formed in the end of a removable barrel closure member 8. The handle may have a suitable threaded socket 7ª for the reception of the end of the screw member. The handle may be rigidly secured to the screw member by exerting external pressure upon the flanged portion 7ᵇ, whereby the metal may be sufficiently distorted to cause the internal threaded surfaces to firmly grip the threads on the member 6.

I prefer to form the lower end of the barrel into a reduced extension 10 which may be of any desired length. Positioned in the lower end of the extension portion 10 is a swivel head 11. This swivel head may have a suitable shoulder engaged by a turned-in portion 10ª formed on the end of the extension. A resilient member 13 may be disposed between a metallic cup member 17 and a disc member 14ª, which may be pressed into position before the shoulder 10ª is formed, both members being apertured to permit passage of the grease. The member 17 presses on a resilient cup washer 28. By thus arranging the cup member to contact with the inner wall of the barrel portion 10 and the end of the swivel head, the joint becomes self-sealing when a high pressure is exerted on the cup by the grease.

At relatively low pressures the cup washer does not become sufficiently pressed against the wall of the barrel extension to prevent leakage of the lubricant. I have, therefore, provided a resilient washer 22 on the swivel head which is maintained in a pressed relation with the wall of the barrel neck by a metallic washer 22ª.

The swivel sealing means embodied in the construction shown in Fig. 2 is satisfactory at low pressures but if it is desired to convert the gun to the pre-pressure type, leather washers or washers formed of any porous material will permit the oil to separate from the grease and filter through.

In Fig. 3 therefore, I have illustrated an alternate swivel construction wherein the self sealing means is shown as comprising a coniform washer 28 loosely mounted on the reduced inner end of the swivel member 11 and a packing member 27 which is composed preferably of compressed cork or similar resilient non-fibrous substance. The packing member is compressed between a coniform surface 11ᵇ formed on the swivel member and the washer by a spring member 13ª. In this construction the spring member 13ª may be of sufficient strength to cause the washer 27 to compress and expand the packing member 26 against the inner wall of the gun barrel with sufficient force to prevent leakage of the lubricant when low pressures are being exerted upon the grease. It is evident that the washer 28 is free to move against the packing as the pressure is increased in the gun barrel with the result that at extremely high pressures, the packing is compressed correspondingly and the oil in the grease will not filter through.

By properly proportioning the discharge end of the gun barrel, it is possible to attach the coupling means directly to the gun without detracting from the efficient manipulation or operation of the device. I obtain this result by having the coupling means disposed at an obtuse angle to the gun barrel.

Thus, by connecting the coupling means directly to the swivel head 11 and at an angle substantially 45° from the center line of the gun barrel, it is possible to quickly and efficiently connect the gun to any one of a number of lubricating nipples disposed about the mechanism to be lubricated. Hence the feature of arranging the coupling means on the swivel head at approximately this angle is of importance in that by doing so I eliminate the necessity of using flexible or articulated conduits. The coupling means herein referred to is illustrated and described in my application on a grease gun, Serial No. 514,038. In the present illustration however, I have shown a few modifications.

This device has a tubular body 14 secured to an externally threaded extension 11ª formed on the swivel head 11. The body member 14 is adapted to carry self-closing means for sealing the connection between the gun and the nipple when the gun is placed in use, such as a resilient cup washer 25ª slidably mounted therein and maintained in abutting relation with the body shoulder 14ᵇ by a spring member 25. An outer slidable sleeve 15 is supported on the body and is arranged to bring the gripping jaws 16, into engagement with a suitable shoulder formed on each nipple. The outward movement of this sleeve is limited by an upset lug 15ª abutting a suitable shoulder formed on the coupling member 14. An annular expansible ring 23 may serve to tilt the jaws 16 about the upset jaw fulcrums 24, when the sleeve 15 is shifted toward the swivel head. The body 14 may have suitable annularly formed grooves for receiving the fulcrum portions 24 of the jaws; also a groove for the spring ring 23.

By having the swivel head 11 and the body body 14 of the coupling means in rigid relation, it is to be seen that the coupling means may be rotated about the center of the gun barrel, and at a definite angle thereto. The particular advantage of this swivel arrangement is that the gun barrel may be rotated while the gun is attached to the nipple. The handle may be oscillated through a definite angle without necessitating the removal of the hand, while the grip is intermittently released upon the gun barrel to permit the turning thereof when the grease is being compressed by the piston. The external surfaces of the gun barrel 5 and its cap may be suitably scored to afford a firm gripping thereof.

If it is desired to produce a pressure in the gun barrel before the gun is placed in use, a valve is required to seal the gun barrel when the latter is not connected to a lubricating nipple. In Fig. 3, I have illustrated a very simple and very efficient valve construction arranged in the swivel head 11 and in alignment with the coupling means whereby the passageways leading from the gun barrel to the discharge mouth of the coupling means may be closed. The valve comprises a stem 18 having a needle point 19 rigidly secured on the inner end thereof. A suitable cup disc 20 may be secured to the outer end of the stem 18 and serve as a handle therefor.

By making the valve stem in two parts, namely, the stem proper and the pointed member 19, it is possible to rigidly mount a simple packing means 21 on the valve stem which will effectively act to seal the threaded aperture formed in the swivel head for the reception of the needle stem. The packing means 21 and the needle member 19 may first be pressed on the reduced portion 18ª of the stem 18 after which a properly sized thread may be formed on the packing means and on the enlarged portion 19ª of the pointed member 19. I prefer to score the opposing ends of the stem member 18 and needle member 19 whereby the packing may be prevented from rotating on the stem.

From the foregoing description of my device, it is apparent that I have provided a grease gun having extraordinary features of simplicity and economy of construction, and in which a minimum number of parts are used to obtain a gun construction which will meet the commercial requirements of such a device. Furthermore, in obtaining this simple construction, I have sacrificed none of the characteristics which make such a device efficient. Likewise, it will be noted that if it is desired to convert the gun to the so-called pre-pressure type, a very simple valve means may be incorporated in the swivel head which will be accessible under all circumstances when the gun is coupled to the lubricating nipples and which will not interfere with the coupling of the gun to such nipples as are disposed in confined places about the mechanism being lubricated.

Having thus described my invention, I claim:—

1. In a lubricant compressor having a compressor barrel, a swivel member rotatably mounted coaxial with said compressor barrel, means for preventing leakage between the compressor barrel and said swivel member, and coupling means rigid with the latter and disposed at an obtuse angle to the axis thereof.

2. In a lubricant compressor of the character described, the combination of a compressor barrel having a discharge end thereof formed to receive a swivel mechanism, a swivel member coaxial with said compressor and supported by the discharge end thereof, coupling means adapted to connect the compressor to a lubricant receiving nipple, said coupling means being rigidly carried by the swivel member at an angle other than a right angle to the axis thereof, and means carried at the end of the compressor to prevent leakage of lubricant between said swivel member and the compressor barrel including a flexible washer and a resilient member, said flexible washer being in abutting relation with the swivel member.

In testimony whereof, I hereunto affix my signature.

OSCAR ZERK.